(12) United States Patent
Foong et al.

(10) Patent No.: US 12,534,232 B2
(45) Date of Patent: Jan. 27, 2026

(54) ROBOT SYSTEM INCLUDING AN AERIAL VEHICLE AND A GROUND VEHICLE

(71) Applicant: Singapore University of Technology & Design, Singapore (SG)

(72) Inventors: Shaohui Foong, Singapore (SG); Jer Luen Chien, Singapore (SG); Clarissa Tze Lyn Leong, Singapore (SG); Jingmin Liu, Singapore (SG); Jia Hwee Low, Singapore (SG)

(73) Assignee: Singapore University of Technology & Design, Singapore (SG)

( * ) Notice: Subject to any disclaimer, the term of this patent is extended or adjusted under 35 U.S.C. 154(b) by 215 days.

(21) Appl. No.: 18/577,511

(22) PCT Filed: Jul. 7, 2022

(86) PCT No.: PCT/SG2022/050471
§ 371 (c)(1),
(2) Date: Jan. 8, 2024

(87) PCT Pub. No.: WO2023/282851
PCT Pub. Date: Jan. 12, 2023

(65) Prior Publication Data
US 2024/0327042 A1  Oct. 3, 2024

(30) Foreign Application Priority Data

Jul. 9, 2021 (SG) .............................. 10202107539S

(51) Int. Cl.
*B64U 10/60* (2023.01)
*B25J 18/06* (2006.01)
(Continued)

(52) U.S. Cl.
CPC .............. *B64U 10/60* (2023.01); *B25J 18/06* (2013.01); *B25J 19/0025* (2013.01);
(Continued)

(58) Field of Classification Search
CPC ........ B64U 10/60; B64U 10/13; B64U 50/34; B64U 2101/29; B64U 2201/202; B25J 18/06; B25J 19/0025
See application file for complete search history.

(56) References Cited

U.S. PATENT DOCUMENTS

| | | | |
|---|---|---|---|
| 2011/0180667 A1* | 7/2011 | O'Brien | B64U 10/60 244/135 R |
| 2018/0257774 A1* | 9/2018 | Volpi | B25J 15/00 |
| 2019/0366375 A1 | 12/2019 | Thompson et al. | |

FOREIGN PATENT DOCUMENTS

| | | | |
|---|---|---|---|
| CN | 105599916 A | 5/2016 | |
| CN | 108706097 A | 10/2018 | |

(Continued)

OTHER PUBLICATIONS

D. Lunni, A. Santamaria, R. Rossi, P. Rocco, L. Bascetta, and J. A. Cetto, "Nonlinear model predictive control for aerial manipulation," pp. 87-93, 2017.

(Continued)

*Primary Examiner* — Navid Z. Mehdizadeh
*Assistant Examiner* — Matthew Ho

(57) ABSTRACT

Aspects concerning a robot system is provided comprising a ground vehicle, an aerial vehicle capable of flight, and a tether connecting the aerial vehicle to the ground vehicle, wherein the tether comprises on or more Bowden cables, each having an inner cable connected at one end to a respective motor of one or more motors of the ground vehicle and at another end to a component of the aerial vehicle, wherein the ground vehicle comprises a motor controller configured to control movement of the component of the aerial vehicle by controlling the one or more motors.

11 Claims, 6 Drawing Sheets

(51) Int. Cl.
  *B25J 19/00* (2006.01)
  *B64U 10/13* (2023.01)
  *B64U 50/34* (2023.01)
  *B64U 101/29* (2023.01)

(52) U.S. Cl.
  CPC .............. *B64U 10/13* (2023.01); *B64U 50/34* (2023.01); *B64U 2101/29* (2023.01); *B64U 2201/202* (2023.01)

(56) References Cited

FOREIGN PATENT DOCUMENTS

| | | |
|---|---|---|
| CN | 109659063 A | 4/2019 |
| DE | 7004973 U | 4/1976 |
| GB | 2008960 A | 6/1979 |

OTHER PUBLICATIONS

D. Lee, J. Liu, S. M. Lee, and S. Foong, "Automated dimensional extraction of different regions using single monocular camera in pseudo-stereo configuration," 2020 IEEE/ASME International Conference on Advanced Intelligent Mechatronics (AIM), pp. 314-321, 2020.

S. M. Lee, J. L. Chien, E. Tang, D. Lee, J. Liu, R. Lim, et al., "Hybrid kinematics modelling for an aerial robot with visual controllable fluid ejection," 2020 IEEE/ASME International Conference on Advanced Intelligent Mechatronics (AIM), pp. 832-838, 2020.

H. Ando, Y. Ambe, A. Ishii, M. Konyo, K. Tadakuma, S. Maruyama, et al., "Aerial hose type robot by water jet for fire fighting," IEEE Robotics and Automation Letters, vol. 3, No. 2, pp. 1128-1135, 2018.

J. Burgner-Kahrs, D. C. Rucker, and H. Choset, "Continuum robots for medical applications: A survey," IEEE Transactions on Robotics, vol. 31, No. 6, pp. 1261-1280, 2015.

M. Jha and N. R. Chauhan, "A review on snake-like continuum robots for medical surgeries," IOP Conference Series: Materials Science and Engineering, vol. 691, pp. 012093, Dec. 2019.

V. Falkenhahn, T. Mahl, A. Hildebrandt, R. Neumann, and O. Sawodny, "Dynamic modeling of bellows-actuated continuum robots using the Euler-Lagrange formalism," IEEE Transactions on Robotics, vol. 31, No. 6, pp. 1483-1496, 2015.

A. Amouri, C. Mahfoudi, and A. Zaatri, "Dynamic modeling of a spatial cable-driven continuum robot using Euler-Lagrange method," International Journal of Engineering and Technology Innovation, vol. 10, No. 1, pp. 60-74, 2020.

V. Falkenhahn, T. Mahl, A. Hildebrandt, R. Neumann, and O. Sawodny, "Dynamic modeling of constant curvature continuum robots using the Euler-Lagrange formalism," 2014 IEEE/RSJ International Conference on Intelligent Robots and Systems, pp. 2428-2433, 2014.

W. S. Rone and P. Ben-Tzvi, "Continuum robot dynamics utilizing the principle of virtual power," IEEE Transactions on Robotics, vol. 30, No. 1, pp. 275-287, 2014.

R. J. Webster, III, and B. A. Jones, "Design and kinematic modeling of constant curvature continuum robots: A review," The International Journal of Robotics Research, vol. 29, No. 13, pp. 1661-1683, 2010.

J. Till, V. Aloi, and C. Rucker, "Real-time dynamics of soft and continuum robots based on Cosserat rod models," The International Journal of Robotics Research, vol. 38, No. 6, pp. 723-746, 2019.

J. Till, V. Aloi, K. E. Riojas, P. L. Anderson, R. J. Webster, and C. Rucker, "A dynamic model for concentric tube robots," IEEE Transactions on Robotics, vol. 36, No. 6, pp. 1704-1718, 2020.

P. Qi, C. Liu, A. Ataka, H. K. Lam, and K. Althoefer, "Kinematic control of continuum manipulators using a fuzzy-model-based approach," IEEE Transactions on Industrial Electronics, vol. 63, No. 8, pp. 5022-5035, 2016.

D. Bruder, B. Gillespie, C. D. Remy, and R. Vasudevan, "Modeling and control of soft robots using the Koopman operator and model predictive control," Robotics: Science and Systems XV University of Freiburg, Jun. 2019.

T. G. Thuruthel, Y. Ansari, E. Falotico, and C. Laschi, "Control strategies for soft robotic manipulators: A survey," Soft Robotics, vol. 5, No. 2, pp. 149-163, 2018.

B. Houska, H. Ferreau, and M. Diehl, "ACADO Toolkit—An Open Source Framework for Automatic Control and Dynamic Optimization," Optimal Control Applications and Methods, vol. 32, No. 3, pp. 298-312, 2011.

International Search Report for International Application No. PCT/SG2022/050471 mailed Mar. 13, 2023 (6 pages).

* cited by examiner

ROBOT SYSTEM INCLUDING AN AERIAL VEHICLE AND A GROUND VEHICLE

CROSS REFERENCE TO RELATED APPLICATIONS

This application is a U.S. National Stage of PCT/SG2022/050471 filed Jul. 7, 2022, which claims the benefit of Singapore Application No. 10202107539S filed Jul. 9, 2021, and which applications are incorporated herein by reference. To the extent appropriate, a claim of priority is made to each of the above disclosed applications.

TECHNICAL FIELD

Various aspects of this disclosure relate to robot systems.

BACKGROUND

Unmanned Aerial Vehicles (UAVs) provide a versatile avenue to perform a variety of inspection tasks as they can cover 3D space and are not affected by terrain and ground features. However, as such most UAVs are designed to operate at high altitudes and at distance from the target (building, infrastructure, etc.), UAVs have limited payload capabilities which also limit certain operational requirements (such as sample collection and manipulation).

Inspections that are located at a lower altitude may be carried out using aerial work platforms (AWPs) instead. An aerial work platform (AWP) is a mechanical device used to provide temporary access for people or equipment to inaccessible areas at height. Examples for AWPs are elevating work platforms (EWP), bucket trucks, cherry pickers or mobile elevating work platforms (MEWPs). Two main types of AWPs are:
- Articulated/telescopic mechanism (Cherry picker), which has multiple DOFs (degrees of freedom)
- Scissor mechanism (Scissor lift) which only has a vertical DOF However, AWPs are more difficult to deploy than UAVs which, in contrast to AWPs, are smaller and lighter, mechanically not limited and do not require extensive space or road access but, as mentioned above have lower lifting capacity and shorter operational endurance.

Approaches are desirable which share the advantages of AWPs and UAVs, i.e. are easy to deploy while having sufficient power (and thus lifting capacity) and long operational endurance.

SUMMARY

Various embodiments concern a robot system is provided including a ground vehicle, an aerial vehicle capable of flight and a tether connecting the aerial vehicle to the ground vehicle, wherein the tether includes on or more Bowden cables, each having an inner cable connected at one end to a respective motor of one or more motors of the ground vehicle and at another end to a component of the aerial vehicle, wherein the ground vehicle includes a motor controller configured to control movement of the component of the aerial vehicle by controlling the one or more motors.

According to one embodiment, the aerial vehicle has a robot arm and the component whose movement is controlled by the motor controller is a robot arm with an end-effector.

According to one embodiment, the robot arm has a plurality of discs arranged at a flexible backbone, wherein the discs have one or more holes which guide the inner cables of the one or more Bowden cables.

According to one embodiment, the aerial vehicle includes one or more rotors to make it capable of flight.

According to one embodiment, the tether further includes a data transmission line configured to provide a data connection between the ground vehicle and the aerial vehicle.

According to one embodiment, the motor controller is configured to receive sensor data from the aerial vehicle via the data transmission line and control movement of the component of the aerial vehicle using the received sensor data.

According to one embodiment, the sensor data include information about the position of the component.

According to one embodiment, the tether further includes a power supply line configured to supply electric power from the ground device to the aerial vehicle.

According to one embodiment, the tether further includes a fluid pipe configured to supply fluid from the ground device to the aerial vehicle According to one embodiment, the tether further includes a fluid pipe configured to provide a hydraulic or pneumatic connection between the ground device and the aerial vehicle.

According to one embodiment, the ground vehicle is configured to control a movement of the component or a further component of the aerial vehicle by means of the hydraulic or pneumatic connection.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

A majority of inspection tasks are not located at high altitude so a UAV (Unmanned Aerial Vehicle) designed for high altitudes is often not necessary. On the other hand, as mentioned above, aerial work platforms (AWPs) are hard to deploy.

In view of the above, according to various embodiments, the capability of an aerial unit is enhanced by pairing it with a supporting ground unit which can provide power, data process, fluid source and safety to the aerial unit. The resulting robot system according to one embodiment is a ground-aerial robotic system that targets inspection tasks that require close proximity and even contact to the target.

Figure 1:
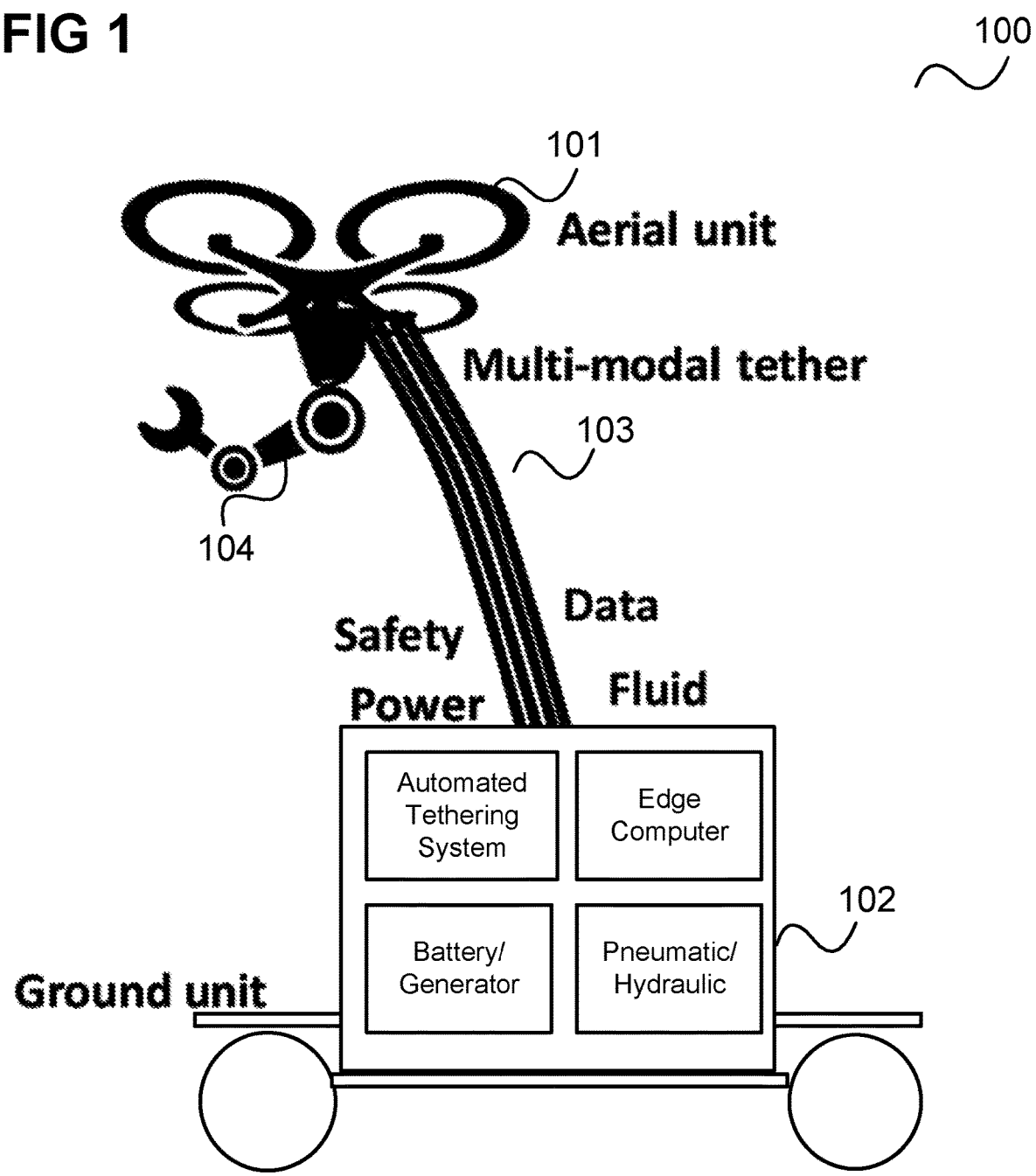
FIG. 1 shows a robot system according to an embodiment.

FIG. 1 shows a robot system 100 according to an embodiment.

The robot system 100 includes an aerial unit (i.e. an aerial vehicle) 101 which is for example implemented based on a multirotor unmanned aerial vehicle (UAV), a mobile ground unit (i.e. a mobile ground device, i.e. a ground vehicle) 102 and a tether 103 tethering the aerial unit 101 to the ground unit 102.

The tether 103 provides a connection to provide power from the ground unit 102 to the aerial unit 101. Further, it provides a datalink so that onboard processing can be carried out on the ground unit 102 rather than aerial unit 101. This allows the aerial unit 101 to remain small and compact.

The tether 103 may include
- a power tether (i.e. a power line) providing power to the aerial unit from the ground unit so that it can operate indefinitely. Without the need for batteries, the aerial unit can be smaller and lighter
- a data tether (i.e. a data line) for the robotic system 100 to perform intelligent operations without the need to provide processing power in the aerial unit 101 which would consume power and add size/weight. By moving the computational system to the ground unit 102, the aerial unit 101 can be smaller and lighter while retaining original capabilities
- a fluid tether (i.e. a fluid pipe): by providing a pneumatic or hydraulic connection to the aerial unit 101, the aerial unit 101 can harness pneumatic/hydraulic tools (e.g. drills) as well as eject fluid for cleaning applications. Fluid can also flow the opposite way for suction and removal of debris
- a safety tether (i.e. a safety cord) to ensure that the aerial unit 101 does not fly away and allow operation near aerodromes The ground unit 102 for example includes an automated tethering system which supports these functionalities of the tether 104 and further components related to these functionalities like one or more batteries or a generator for supplying power to the aerial unit, a microprocessor or computer (which may depending on the application scenario be seen as edge computer) for controlling the aerial unit or motors of the ground unit for controlling movement of a the robot arm 104 via Bowden cables or a pneumatic/hydraulic device or controller for controlling movement a component of the aerial vehicle.

The actuators are located on the ground unit 102 and connected to the aerial unit 101 via the tether 104.

Introducing manipulation to the aerial unit 101 requires incorporating actuators, sensors and a mechanism to enable a controllable (e.g. grasping) motion. These devices are both large and heavy, which may make their integration with the aerial unit 101 cumbersome and may lead to poor performance. Therefore, according to various embodiments, a cable-driven mechanism is used for a specialized manipulator for the robot system 100. This allows that the actuators and other electronic devices are located in the ground unit 102 and the aerial unit 101 can be made compact and agile with fully capability of manipulation.

So, the robot system 100 is an integrated ground-aerial robotic system with a multi-modal tether 103 between the ground unit 102 (also denoted as ground station, ground system or ground vehicle) and an aerial unit 101 (also denoted as aerial vehicle), which may and may hold a cable-driven continuum robot (e.g. robot arm) 104 as manipulator. Flexible aerial manipulation is achieved via cable actuation from the ground, thus removing the need for heavy onboard motors in aerial unit 101. Furthermore, due to the tether 102 supplying power to the aerial unit 101, batteries are not required onboard the aerial unit 101 and the aerial unit 10 has enough endurance to perform what needs to be achieved. The aerial unit 102 may hold a cable-driven continuum robot (e.g. robot arm) 104.

Figure 2:
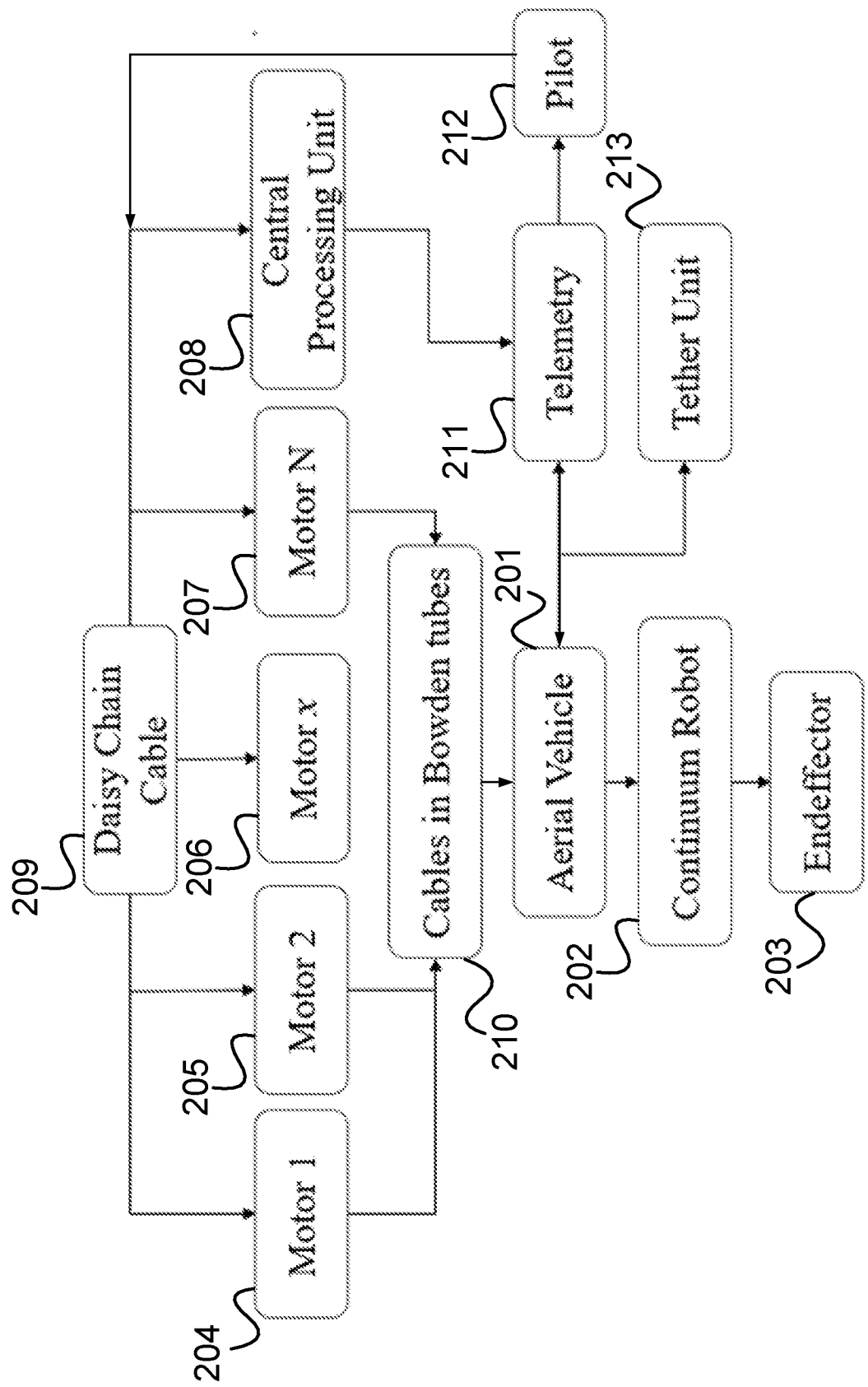
FIG. 2 shows a block diagram of a robot system according to an embodiment.

FIG. 2 shows a block diagram 200 of a robot system according to an embodiment.

As mentioned above, the aerial unit 201 may hold a cable-driven continuum robot 202. The continuum robot 202 can have multiple independent moving stages. The aerial unit 201 may for example be implemented by a quadcopter which is connected to the ground unit 102 by bowden tubes (e.g. of 4 m length) made for example from polytetrafluoroethylene (PTFE). The aerial unit 201 for example includes a continuum arm 202 (as continuum robot 104) in the form of a two-stage robot with a PTFE tube attached as the robot arm's end-effector 203.

The ground unit 102 includes (servo-)motors 204, 205, 206, 207 connected with a central processing unit 208, e.g. in a daisy chain manner via a connection (e.g. bus) 209. They are connected to the aerial unit 201, specifically to its end-effector 203 by (driven) cables in bowden tubes 210. The aerial unit 201 is in communication with a tether unit 213 of the ground station 202. The ground unit 211 may control (pilot) 212 the aerial unit 201 based on telemetry 211 (these functions may be implemented by the central processing unit 208 or by dedicated processing units).

According to various embodiments, a reference frames are used to fully define the kinematics of the robot manipulator 104.

Figure 3:
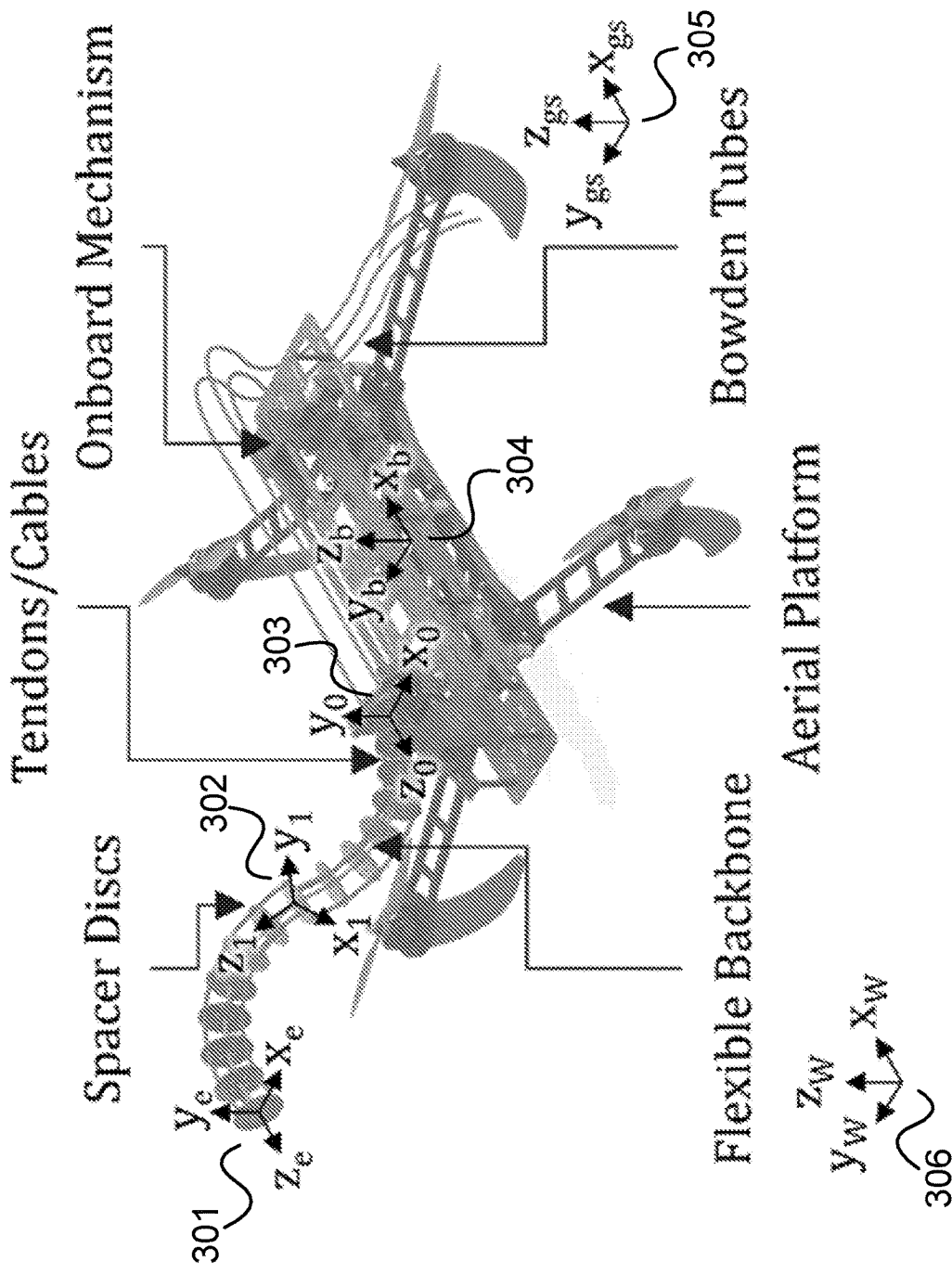
FIG. 3 illustrates the definition of reference frames for a continuum robot of the aerial vehicle, a reference frame for the aerial vehicle and a reference frame for the ground vehicle with respect to a global frame.

FIG. 3 illustrates the definition of reference frames 301 to 303 for the continuum robot, a reference frame 304 for the aerial unit (body) 102 and a reference frame 305 for the ground station 306 with respect to a global (i.e. world) frame 30. Here, $T_{a,b} \in SE(3)$ is used to denote the homogeneous transformation matrix from a reference frame a to a reference frame b. The location of each reference frame can be expressed analytically through the use of homogeneous transformation matrices:

$$T_{w,e} = T_{w,b} T_{b,0} \Pi_{\{i=1\}}^{\{n\}} T_{i-1,i} T_{n,e} \quad (1)$$

where $T_{n,e}$ is the transformation between the n-th reference frame and the reference fream of the end-effector of the robot arm 104, $T_{i-1,i}$ is the transformation between reference frames of subsequent stage of the arm 104, where i=1, . . . , n (i=0 is the robot arm origin and i=1 is the first stage of the robot arm 104). If there is no end-effector, $T_{n,e}=I$. The system is generalized such that $T_{b,1}$ represents an onboard mechanism that allows the entire arm 104 to be shifted around with respect to the body origin of the aerial platform.

For the following derivation of a kinematic model of the continuum robot, the following assumptions are made:

According to Euler-Bernoulli theory it is assumed that the continuum robot bends with a constant curvature.

The continuum robot 104 includes a flexible rod as backbone which is incompressible.

Three cables are used per stage to actuate the robot's end-effector pose. Each stage has two configuration states: bending angle θ and bending plane angle ϕ.

Figure 4:
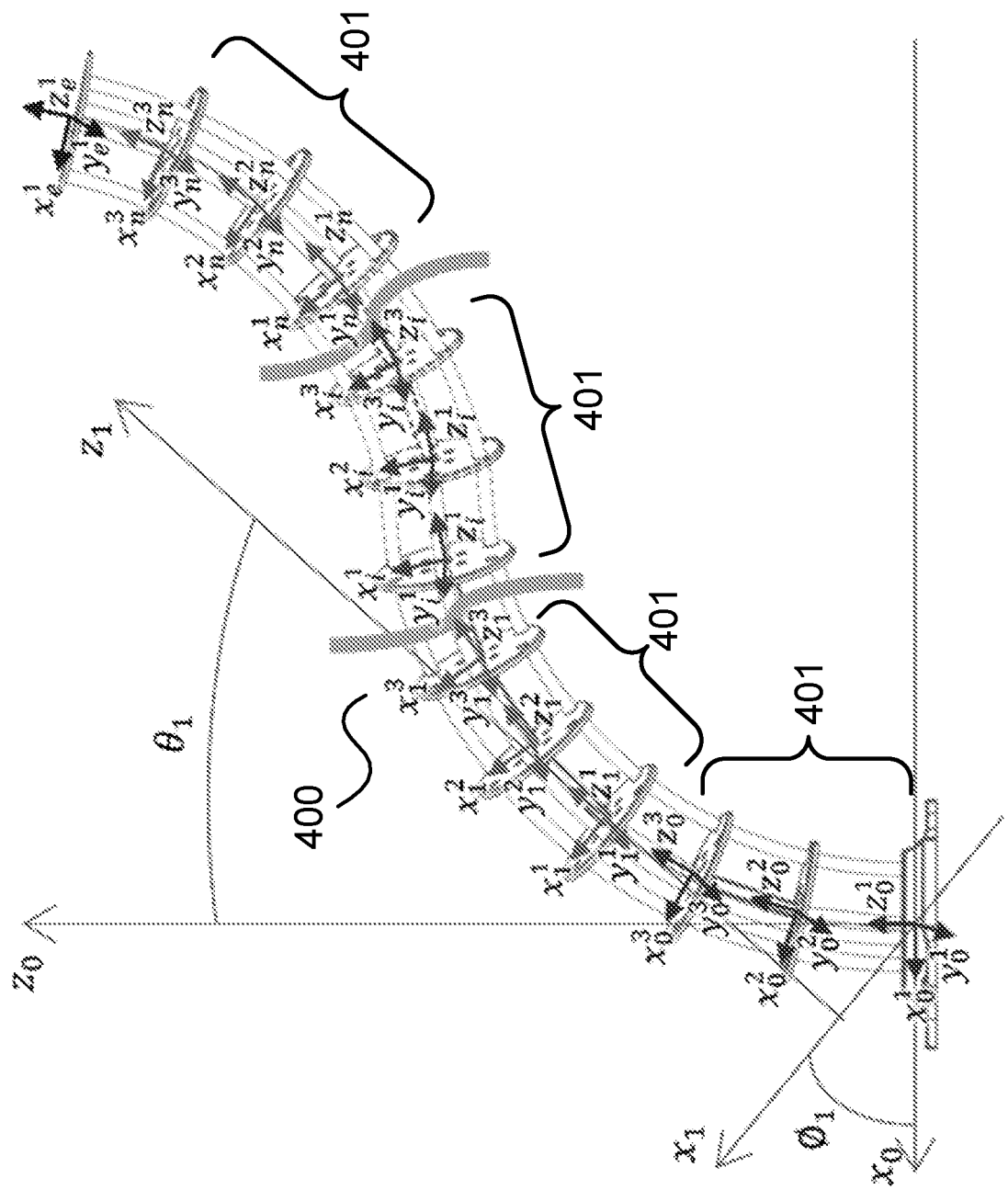
FIG. 4 illustrates a continuum robot including multiple stages.

FIG. 4 illustrates a continuum robot 400 with n stages 401, where θ is the bending angle, ϕ is the bending plane angle, e refers to the end-effector, and i, where i=0, . . . , n, refers to the stage's number. The dotted lines represent an arbitrary number of stages to show that this concept extends to n stages. For illustration purposes, each stage is defined to possess three discs each, as grouped by the curly braces shown in FIG. 4.

With the above assumptions, the resulting transformation matrix $R_{i-1,i} \in SO(3)$ between stages can be expressed as:

$$R_{i-1,i} = \begin{pmatrix} c^2\phi_i c\theta_i + s^2\phi_i & c\phi_i s\phi_i s\theta_i & c\phi_i s\theta_i \\ c\phi_i s\phi_i c\theta_i - c\phi_i s\phi_i & c^2\phi_i + s^2\phi_i c\theta_i & s\phi_i s\theta_i \\ -c\phi_i s\theta_i & s\phi_i s\theta_i & c\theta_i \end{pmatrix} \quad (2)$$

where sθ=sin θ and cθ=cos θ. It should be noted that $$T = \begin{bmatrix} R & p \\ 0 & 1 \end{bmatrix}$$

(indices omitted for simplicity).

Meanwhile, the position $p_{i-1,i} \in R^3$ (i.e. is the relative position of ith state with respect to the i−1th state) can be expressed as:

$$p_{i-1,i}^T = \left( \frac{\bar{l}}{\theta_i}(1-c\theta_i)c\phi_i \quad \frac{\bar{l}}{\theta_i}(1-c\theta_i)s\phi_i \quad \frac{\bar{l}}{\theta_i}s\phi_i \right) \quad (3)$$

where $\bar{l}$ is the nominal length of the rod for the i-th stage. Now, it is possible to determine the velocity kinematics of the arm by taking the Jacobian of the end-effector's position with respect to the configuration states $[\theta_1 \ldots \theta_i \phi_1 \ldots \phi_i]^T$. To generalise, the end-effector's velocity $\dot{p}_{0,n} \in R^3$ is expressed as:

$$\dot{p}_{0,n} = J(\theta) \cdot \dot{\theta} \quad (4)$$

Regarding the mapping of motor variables to configuration states of the manipulator 104, the driven cables 210 of the tether 103 are expressed as a function of the displacements of the motors 204-207 and vice versa. Since each cable 210 is connected to a pulley (driven by the respective motor), the driven cables 210 can be mapped by scaling the motor displacements by the pulley radius:

$$q_{ij} = r\beta_{ij} \quad (5)$$

where β is the angular displacement of the motor, r is the radius of the pulley and $q_{ij}$ is the driving displacement of stage i, cable j. The total length of each cable is expressed as:

$$l_{ij}^{total} = l_{ij}^{tube} + l_{ij}^{arm} \quad (6)$$

$$= l_{ij}^{tube} + \bar{l}_i + q_{ij} \quad (7)$$

where $l_{ij}^{tube}$ is the length of the cables in each tube, $l_{ij}^{arm}$ is the length of each cable at the arm 104.

Figure 5:
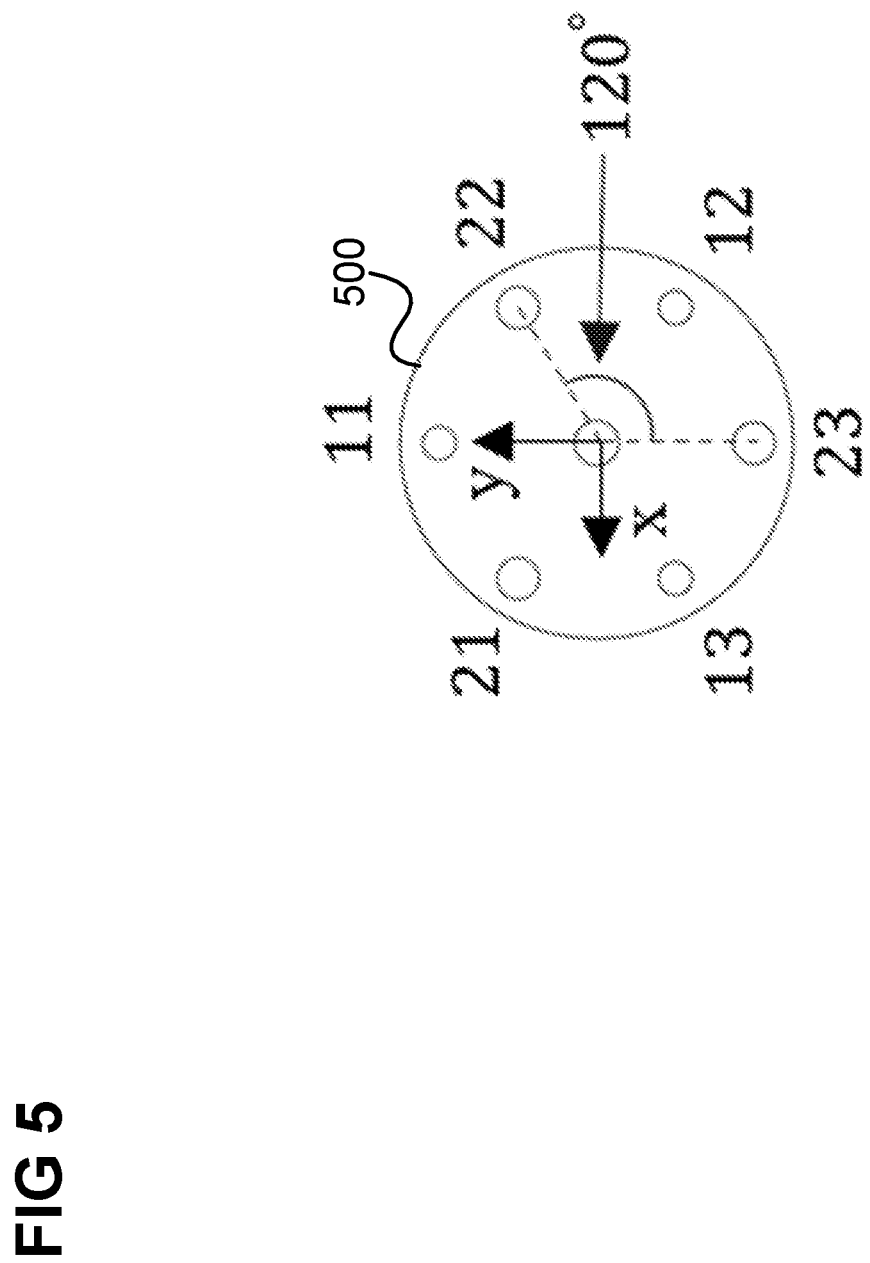
FIG. 5 illustrates the assignment of cables to locations on discs of a two-stage continuum robot.

FIG. 5 illustrates the assignment of cables to locations on a disc 500 of the robot arm 400 for a two-stage continuum robot. Each disc (in the xy plane) has equally distributed holes. The cable with index ij is assigned to the respective disc hole for the j-th actuation cable of the i-th stage. The spatial motion, e.g. the deflection of the flexible backbone is governed by applying adequate tension to one or two cables, at the same time, placed at 120° from each other.

The configuration states can be expressed in terms of the driven cables:

$$\phi_i = a\tan 2(\sqrt{3}(q_{i1}+q_{i2}-2q_{i3}), 3(q_{i1}-q_{i2})) - (i-1)\pi \quad (8)$$

$$\theta_i = \frac{2\bar{l}\sqrt{\{l_{i1}^2 + l_{i2}^2 + l_{i3}^2 - l_{i1}l_{i2} - l_{i1}l_{i3} - l_{i2}l_{i3}\}}}{d\sum_{j=1}^{3} l_{ij}} \quad (9)$$

With these equations, the forward kinematics of the system can be computed. Computing the inverse of the mapping functions is often key in implementing control. The driven cables can be expressed as a function of the configuration states:

$$q_{ij} = d\theta_i \cos(\phi_i + \gamma_{ij}) \quad (10)$$

where $\gamma_{ij}$ is the division angle, i.e. the angle of the hole to which cable ij is assigned on stage i with respect to a reference direction. Eq. (10) can be differentiated with respect to time to determine the relationship between configuration states and actuation states:

$$\dot{q}_{ij} = d(\dot{\theta}_i \cos(\gamma_{ij}-\phi_i) - \theta_i\dot{\phi}_i \sin(\gamma_{ij}-\phi_i)) \quad (11)$$

Now, $\dot{\beta}$ can be found using (5). Subsequently, $\dot{\beta}$ can be used as the reference input for a controller of the motor (e.g. a PID controller).

Regarding displacement efficiency of the continuum manipulator system, when the motors drive the cables for a specified displacement, the ideal system assumes that the cables run through the Bowden tubes smoothly without distorting their shape. However, in the robot system 100, the Bowden tubes bend accordingly to ensure that mechanical power is being transferred to the arm. Extending Eq. (7) gives:

$$l_{ij}^{total} = l_{ij}^{tube} + \bar{l}_i + q_{ij} + l_{ij}^{w} \quad (12)$$

where $l_{ij}^{w}$ is the portion of the driven displacement required to tension the cables in the bowden tubes. The displacement efficiency can be expressed as:

$$\mu_{ij} = \frac{\bar{l}_i + q_{ij}}{\bar{l}_i + q_{ij} + l_{ij}^{w}} \quad (13)$$

According to various embodiments a MPC (Model Predictive Control) controller is implemented in the robot system 100 according to the derived velocity kinematics.

This requires full-state feedback which is obtained by first assuming that $p_{i-1,i}$ is known to determine $\theta_i$ by solving the optimisation problem $$\min_{\theta_i}\left(z_{i-1,i} - \frac{l}{\theta_i}\sin\theta_i\right)^2 \text{ s.t.} \tag{14}$$

$$\theta_i \in [\epsilon, \theta_{upp}]$$

where $\epsilon$ is a small positive number to avoid singularity issues. The value of $\psi_i$ can be found using the equation $$\phi_i = a\tan 2(y_{i-1,i}, x_{i-1,i}) \tag{15}$$

As the function in Eq. (3) is a surjective function, i.e., using Eq. (3), $f(\theta, \psi) = f(-\theta, 2\pi-\psi)$, the domain of $\theta$ is limited such that Eq. (14) and $\psi \in [-\pi,\pi]$ are satisfied, for (3) to be bijective. Supposing that the solution is not bounded to Eq. (14), the discontinuous error signal can create erratic system behaviours, especially in linear PID controllers. It should be noted that using motor encoders to estimate $\theta$ may be avoided as Eq. (13) is likely to demonstrate nonlinear behaviour in real life. It is further assumed that the kinematics of the system is substantially faster than its dynamics. Hence, the effects of mass and inertia in the system, and effectively the transient response of the motors, can be ignored. From Eq. (4), the configuration states are appended to the state-space system to get:

$$\dot{x} = f(x, u) \tag{16}$$

$$\begin{pmatrix} \dot{p}_{0,n} \\ \dot{\theta} \end{pmatrix} = \begin{pmatrix} J(\theta) & \dot{\theta} \\ & \dot{\theta} \end{pmatrix}$$

where $x=[x, y, z, \theta_1 \ldots \theta_i \phi_1 \ldots \phi_i]^T$, $u=[\dot{\theta}_1 \ldots \dot{\theta}_i \dot{\phi}_1 \ldots \dot{\phi}_i]^T$. The MPC problem can be formulated as a least squares function, subjected to kinematic constraints and upper and lower bounds of states and constraints. We can express the optimisation problem mathematically as:

$$\min_{x,u} \sum_{k=0}^{N+1} x_k^T Q x_k + \sum_{k=0}^{N} u_k^T R u_k + x_f^T P x_f \text{ s.t.} \tag{17}$$

$$x(k+1) = f(x, u)$$

$$x_{upp} \geq x(k) \geq x_{low}$$

$$u_{upp} \geq u(k) \geq u_{low}$$

where N is the length of the prediction horizon, and Q, R are positive definite matrices to penalise state errors and control inputs while P accounts for the terminal cost enforcing stability. Here, the domain of $\theta_i \in [-\pi/2,\pi/2]$ and $\psi_i \in [-2\pi, 2\pi]$ is relaxed to ensure that the solver can dynamically plan its path to the desired reference point.

Figure 6:
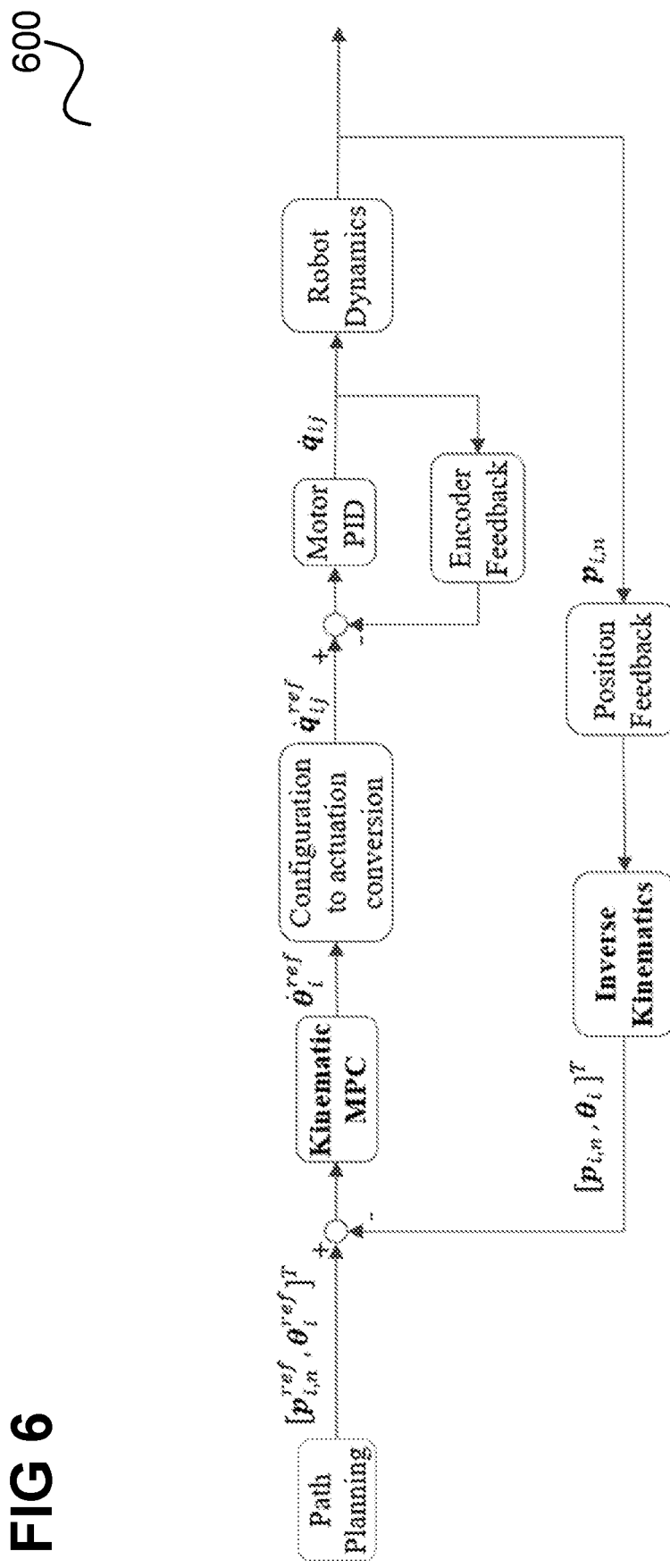
FIG. 6 shows a control block diagram of a robot system according to an embodiment.

FIG. 6 shows a control block diagram 600 of the robot system (including mappings for controlling the continuum robot). Solving for the objective function of (17) returns the motor velocities as inputs, which are then mapped into actuation velocities using Eq. (11). Then Eq. (5) gives the command velocity to the servomotor in order to move the continuum robot at the desired actuation velocity. The position of the end-effector is then used to determine the configuration states using the optimization problem (14) and Eq. (15), effectively providing full state feedback.

Experiments show that the continuum robot's end-effector can draw a circle in, i.e. with reference points varying with time according to $$x_{ref} = r\sin(\omega t) \tag{18}$$

$$y_{ref} = r\cos(\omega t) \tag{19}$$

with bounded tracking error.

It should be noted that
i. The transient responses of the motors are not negligible in practical application. The rise time of the motors increase as the stiffness of the continuum robot increases.
ii. The continuum robot is assumed to bend with a constant curvature, which is only an approximation of the robot's true behaviour.
iii. The sensors are assumed to be error free and provide full state feedback. However, the optimization problem (14) and Eq. (15) are based on the constant curvature assumption.

Further, transmission losses (due to the cables running in the tubes) impacting performance should be taking into account.

The robot system 100 thus includes a tethered aerial unit 101 capable of flight including a cable-driven continuum manipulator 103 and actuation whilst drawing its power from its ground station system 102. Transmission of mechanical work from the ground station to the continuum end-effector of the manipulator 103 is achieved via cables over, e.g., four metres in length. It combines the maneuverability of an aerial vehicle with the flexibility of a continuum robot to make it an ideal candidate for a variety of operations in distant and narrow locations with a higher level of operational safety. The novelty of multi-modal tether of the system allows for the following:

i. Unified safety for operations which require it, to prevent the occurrence of fly-aways, like those near aerodromes,
ii. Longer endurance with sufficient power for extended aerial operation via a power tether to a high-capacity power source on the ground station system,
iii. More robustness and capacity for computational-heavy algorithms and data utilization for real-time analysis, to boost its performance, via a data tether to a high-performance edge computing unit on the ground station system,
iv. Off-board actuation of various components via robust cables to the winch system on the ground station system to reduce the weight and improve the performance and efficiency of the aerial unit during operations, and
v. Potential incorporation of pneumatic or hydraulic powered equipment and machines, like drills, on the aerial unit via a fluid tether.'

With these, together with the employment of intrinsic (onboard sensors) and extrinsic (externally placed sensors) approaches, providing high localization and navigation capabilities, the robot system according to various embodiments can be operated in close proximity to the target such that:

i. Direct or extremely close interactions with the target is permissible during operations, and
ii. Operations in confined and fully enclosed environments are possible.

The continuum end-effector 104 with a gripping mechanism has potential applications of integrated and lightweight manipulators that may be optimised to enable the robot system 100 to perform advanced interactive tasks requiring direct contact. Various mechanisms can be developed or adapted for mounting to the end of the end-effector to achieve a wide range of applications in which the robot system 100 can be deployed to. Actuation of these mechanisms can be located off-board the aerial unit 101 on the ground station system 102 to reduce its weight and increase its agility. This bolsters its close-proximity to-target-operations capability whilst optimizing the performance of the aerial unit and end-effector.

In summary, according to various embodiments, a robot system is provided including a ground vehicle, an aerial vehicle capable of flight and a tether connecting the aerial vehicle to the ground vehicle, wherein the tether includes on or more Bowden cables, each having an inner cable connected at one end to a respective motor of one or more motors of the ground vehicle and at another end to a component of the aerial vehicle, wherein the ground vehicle includes a motor controller configured to control movement of the component of the aerial vehicle by controlling the one or more motors.

The robot system has for example a maximum altitude (of the aerial vehicle) of 20 m, a diagonal footprint of the ground vehicle of 1.25 m, a payload of the aerial vehicle of a maximum of 1 kg, a weight of 25 kg and is for example electrically supplied (e.g. by 16V by a one or more batteries).

The control operations described herein may be performed and the various processing or computation units and the devices and computing entities described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A robot system comprising:
a ground vehicle;
an aerial vehicle capable of flight; and
a tether connecting the aerial vehicle to the ground vehicle,
wherein the tether comprises one or more Bowden cables, each having an inner cable connected at one end to a respective motor of one or more motors of the ground vehicle and at another end to a component of the aerial vehicle; and
wherein the ground vehicle comprises a motor controller configured to control movement of the component of the aerial vehicle by controlling the one or more motors.

2. The robot system of claim 1, wherein the aerial vehicle has a robot arm and the component whose movement is controlled by the motor controller is the robot arm with an end-effector.

3. The robot system of claim 2, wherein the robot arm has a plurality of discs arranged at a flexible backbone, wherein the discs have one or more holes which guide the inner cables of the one or more Bowden cables.

4. The robot system of claim 1, wherein the aerial vehicle comprises one or more rotors to make it capable of flight.

5. The robot system of claim 1, wherein the tether further comprises a data transmission line configured to provide a data connection between the ground vehicle and the aerial vehicle.

6. The robot system of claim 5, wherein the motor controller is configured to receive sensor data from the aerial vehicle via the data transmission line and control movement of the component of the aerial vehicle using the received sensor data.

7. The robot system of claim 6, wherein the sensor data comprise information about a position of the component.

8. The robot system of claim 1, wherein the tether further comprises a power supply line configured to supply electric power from the ground vehicle to the aerial vehicle.

9. The robot system of claim 1, wherein the tether further comprises a fluid pipe configured to supply fluid from the ground vehicle to the aerial vehicle.

10. The robot system of claim 1, wherein the tether further comprises a fluid pipe configured to provide a hydraulic or pneumatic connection between the ground vehicle and the aerial vehicle.

11. The robot system of claim 10, wherein the ground vehicle is configured to control a movement of the component or a further component of the aerial vehicle by means of the hydraulic or pneumatic connection.

* * * * *